US011341012B2

(12) United States Patent
Wilson, Jr.

(10) Patent No.: US 11,341,012 B2
(45) Date of Patent: May 24, 2022

(54) TEST PLATFORM EMPLOYING TEST-INDEPENDENT FAULT INSERTION

(71) Applicant: EMC IP Holding Company LLC, Hopkinton, MA (US)

(72) Inventor: Charles R. Wilson, Jr., Hampstead, NH (US)

(73) Assignee: EMC IP Holding Company LLC, Hopkinton, MA (US)

(*) Notice: Subject to any disclaimer, the term of this patent is extended or adjusted under 35 U.S.C. 154(b) by 47 days.

(21) Appl. No.: 16/874,131

(22) Filed: May 14, 2020

(65) Prior Publication Data
US 2021/0357299 A1    Nov. 18, 2021

(51) Int. Cl.
*G06F 11/22*    (2006.01)
*G06F 11/07*    (2006.01)
*G06F 11/263*   (2006.01)
*G06F 11/27*    (2006.01)

(52) U.S. Cl.
CPC ...... *G06F 11/2273* (2013.01); *G06F 11/0772* (2013.01); *G06F 11/263* (2013.01); *G06F 11/27* (2013.01)

(58) Field of Classification Search
CPC ............ G06F 11/2273; G06F 11/263; G06F 11/0772; G06F 11/27
See application file for complete search history.

(56) References Cited

U.S. PATENT DOCUMENTS

| | | | | |
|---|---|---|---|---|
| 3,419,849 A | * | 12/1968 | Anderson | G06F 9/4825 710/49 |
| 3,530,438 A | * | 9/1970 | Nelson | G06F 15/17375 718/100 |
| 4,875,209 A | * | 10/1989 | Mathewes, Jr. | G01R 31/318566 714/703 |
| 9,628,339 B1 | | 4/2017 | Thai et al. | |
| 2005/0160322 A1 | * | 7/2005 | West | G06F 40/154 714/38.1 |
| 2005/0188271 A1 | * | 8/2005 | West | G06F 11/3684 714/38.1 |
| 2005/0268170 A1 | * | 12/2005 | Kearney | G06F 11/2273 714/32 |
| 2006/0156153 A1 | * | 7/2006 | Fossum | G06F 11/0793 714/746 |
| 2007/0016829 A1 | * | 1/2007 | Subramanian | G06F 11/3684 714/38.1 |
| 2011/0239048 A1 | * | 9/2011 | Andrade | G06F 11/3616 714/35 |
| 2013/0055042 A1 | * | 2/2013 | Al Za'noun | G06Q 10/06395 714/746 |

(Continued)

*Primary Examiner* — Kamini B Patel
(74) *Attorney, Agent, or Firm* — BainwoodHuang (57) ABSTRACT

A method of testing a data storage system includes maintaining libraries of test routines, a first library including a set of normal-functional tests each operable to test corresponding normal functionality of the data storage system, a second library including a set of fault inserters each being independently operable to induce a corresponding fault condition into the data storage system. Normal-functional tests are executed concurrently with one or more of the fault inserters to cause the normal-functional tests to encounter the corresponding fault conditions during execution and thereby test a response of the normal functionality of the data storage system to the occurrence of the fault conditions.

21 Claims, 4 Drawing Sheets

(56) References Cited

U.S. PATENT DOCUMENTS

| | | | | |
|---|---|---|---|---|
| 2014/0181590 A1* | 6/2014 | Wefers | ................ | G06F 11/3688 |
| | | | | 714/38.1 |
| 2014/0289564 A1* | 9/2014 | Rugina | ............... | G06F 11/0712 |
| | | | | 714/38.1 |
| 2015/0161025 A1* | 6/2015 | Baset | ................. | G06F 11/3612 |
| | | | | 714/38.1 |
| 2018/0060221 A1* | 3/2018 | Yim | .................... | G06F 11/3684 |

\* cited by examiner

TEST PLATFORM EMPLOYING TEST-INDEPENDENT FAULT INSERTION

BACKGROUND

The present invention is related to the field of testing of computerized equipment such as a data storage system.

SUMMARY

A method of testing a data storage system includes maintaining libraries of test routines, a first library including a set of normal-functional tests each operable to test corresponding normal functionality of the data storage system, a second library including a set of fault inserters each being independently operable to induce a corresponding fault condition into the data storage system. Normal-functional tests are executed concurrently with one or more of the fault inserters to cause the normal-functional tests to encounter the corresponding fault conditions during execution and thereby test a response of the normal functionality of the data storage system to the occurrence of the fault conditions. The method can provide power and flexibility in testing operation under various fault scenarios in an efficient manner not requiring development and maintenance of fault-specific variants of the normal-functional tests.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The present description is directed to the use of normal-functional tests along with independent fault inserters in order to test a response of normal functionality of a device under test (DUT), such as a data storage system, to corresponding fault conditions. In this description, the normal-functional tests are also referred to as "sunny day" tests or test cases.

The cost/overhead for developing sunny day test cases as well as an assortment of faults to apply in variations of this testing can be expensive and time consuming. Each test, whether sunny day or a fault related variant, has its own uniqueness and thus can incur the same or similar cost/overhead, such as for debug and validation. Thus an alternative approach is described that employs faults as stand-alone assets that can be generically applied to any sunny day test case during execution. Each fault is accompanied by a corresponding fault handler to intercept and validate that the correct or unexpected faulty behavior results from its introduction.

In typical existing test systems, sunny day testing is used that is meant to validate the expected behavior of a device's capabilities and features. Additional tests are created and used that simulate faults occurring during the natural operation of these tests, such as network outages, disk faults, etc., to evaluate the reaction. These test cases with inserted faults tend to be embedded in the test case and therefore this is a standalone variation of the original test case. Since the fault case takes similar time, resources and attention as a sunny day test case, priority is put on developing sunny day test cases, with lower priority put on developing fault variants. Therefore tests cases with fault insertion tend to get less attention and coverage. Also, faults are generally newly developed logic within specific test cases, so that an inserted fault (such as a drive fault) is not a generic asset that can be implemented globally. There are thus many variations and duplicated logic implemented independently, with associated overhead of supporting many variations, debugging and fixing many variations, etc.

With a global fault insertion technique as described herein, there is a supporting framework to build singular generically usable faults that can then be consumed globally across an organization with investment being applied to advance the capability of a singular asset. For instance, there may be a suite of global drive faults, network faults, IO faults, etc., that can be used in connection with testing across an organization. These faults are not utilized by embedding them in a selected sunny day test, but rather by selection of a fault to be run in parallel with a sunny day test (e.g., at a given time, at intervals, with an offset, etc.), without the embedded knowledge of the sunny day test.

In this arrangement, the sunny day tests may utilize configuration details that could be consumed by any fault. Such configuration details can identify various assets being used by the test (e.g., specific disk drives, ports, services, etc.), so that the faults apply the proper context. For instance, if a sunny day test case is operated on a specific pool of disk extents, then the generic drive fault should be able to consume this configuration detail so that it can identify the proper drive to simulate a fault on, i.e., the drive providing that pool of extents.

Glossary:

In the description, the following terms and acronyms are used:

DUT: Device Under Test—The device being tested. This description focuses primarily on testing of data storage systems, but those skilled in the art will appreciate that it can be applied to other kinds of DUTs, such as workstations, keyboards, disk drives, servers, watches, etc.

GTM: Global Test Manager—Central device to manage all activities for the Test ECO System, in most cases this will collaborate with the TEHC and/or FHC on the DUT but there may be cases where the GTM can manage activities on the DUT directly without local clients.

DSS: Data Storage System

TEHC: Test Execution Handler Client—Client on the DUT, as needed, to apply, manage, insert, sequence, execute, intercept and provide response based on direction from the GTM for the NFT execution FMC: Fault Management Client—Client on the DUT, as needed, to apply, manage, insert, sequence, execute, intercept and provide response based on direction from the GTM for the fault insertion/overlay FI: Fault Inserter NFT: Normal-Functional Tests. that test normal functionality of the DUT. A test case that is intended to validate a defined or expected capability of the DUT without any pre-determined expectation or knowledge of any variety of fault scenarios or conditions. NFTs may be any of a variety of general types such as unit test, functional tests, system tests, regression test, interoperability tests, stress tests, scale tests, etc.

DESCRIPTION OF EMBODIMENTS

Figure 1:
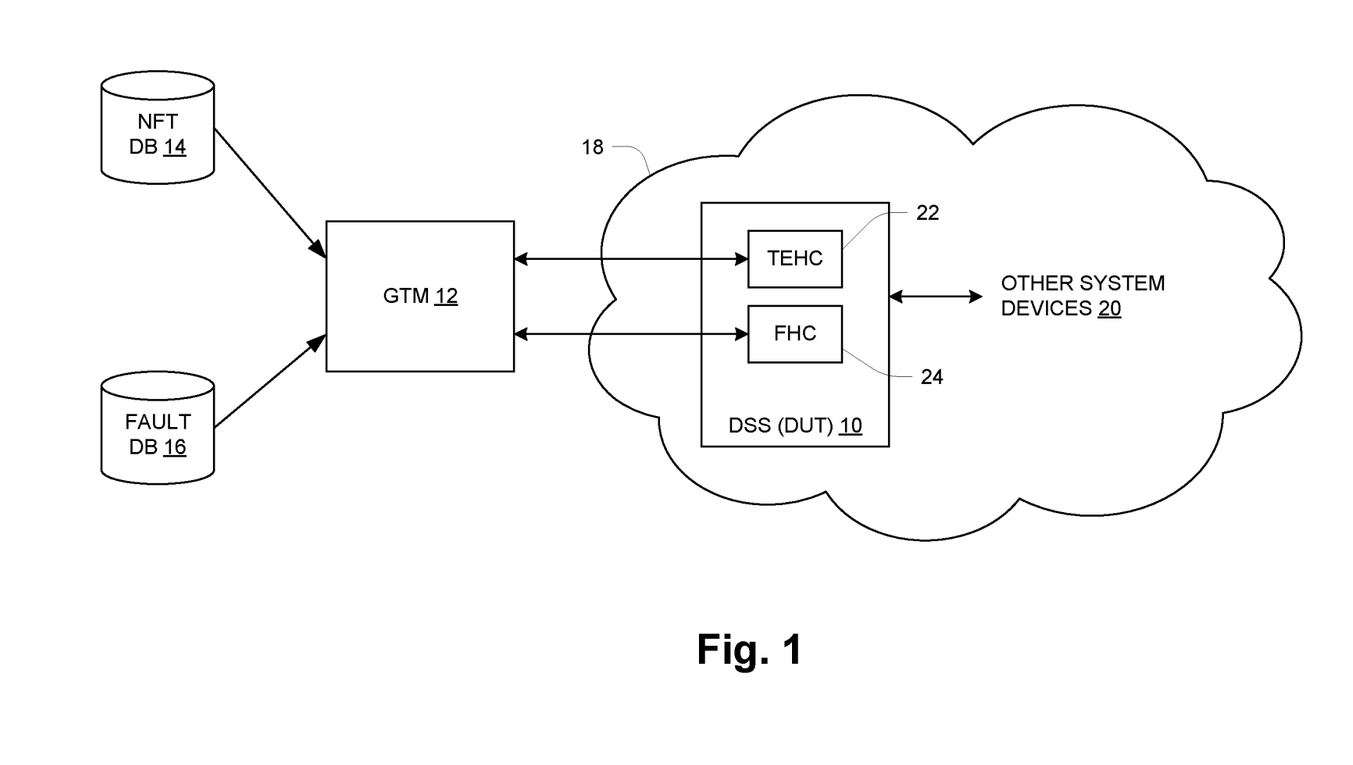
FIG. 1 is a block diagram of a test platform.

FIG. 1 shows a testing platform for performing functional testing of a complex device under test (DUT), which in this example is a data storage system (DSS) 10. As mentioned, the general term "functional test" is used herein to cover a variety of general test types. The platform includes a global test manager (GTM) 12 having access to two libraries of test routines, shown as a normal functional test database (NFT DB) 14 and a fault inserter database (FAULT DB) 16. The DSS 10 is part of a larger test ecosystem 18 having a collection of other system devices 20, such as network switches/routers, specialized servers (e.g., Domain Name System (DNS) servers), and other DSSs (not shown in FIG. 1). The DSS 10 is shown as including two specialized functional modules, a test execution handler client (TEHC) 22 and a fault handler client (FHC) 24, having respective connections to the GTM 12. Further details regarding the structure of the DSS 10 are provided below.

In operation, the GTM 12 manages all activities of the test ecosystem 18, in many cases collaborating with the TEHC 22 and/or FHC 24 on the DSS 10 (although it may manage some activities more directly, without involvement of the clients 22, 24). The NFT DB 14 stores normal functional tests (NFTs) that are executed to validate a defined or expected capability of the DSS 10 under normal operating circumstances, generally without presence of fault conditions. As an example, an NFT may cause the DSS 10 to perform an extended series of data write and read operations, using some pattern (which may have a random component) of addresses and data, testing the ability of the DSS 10 to correctly store a collection of data and correctly provide the stored data back to a requestor. The Fault DB 16 stores a collection of fault inserter (FI) routines that are executed to inject corresponding fault conditions into the DSS 10. By executing one or more FI routines to inject faults while concurrently executing a set of NFTs, it is possible to test the response of the normal functional components of the DSS 10 to the occurrence of the faults. Moreover, as outlined above, because the fault injection is independent of any particular NFT or set of NFTs, this scheme can provide for much greater flexibility and power in testing operation under a variety of fault scenarios, without requiring the effort of developing specialized functional tests for all function-fault combinations to be tested. Rather, the GTM 12 can use the NFTs and FIs in a modular or building-block fashion to achieve desired test coverage.

To effect such operation, the GTM 12 employs functionality of the TEHC 22 and FHC 24. The TEHC 22 applies NFTs as instructed by the GTM 12, i.e., it performs local operations to execute the NFTs (e.g., injecting read/write commands at a front-end port of the DSS 10, according to the content of an NFT). More specifically, it manages the timing, sequence, execution and response for the NFTs based on direction from the GTM 12. It also collects an inventory and environmental details of the ecosystem 18 and provides these to the FHC 24 for its use. The FHC 24 applies faults and manages their timing, sequence, execution and response also based on direction from the GTM 12. One particular function of the FHC 24 is to mask the effects of injected faults from the normal fault-handling mechanisms of the DSS 10 itself, enabling a desired interaction between normal-functional components of the DSS 10 (e.g., read command execution logic) and injected fault conditions, to evaluate response. As an example, a "disk full" condition might normally result in an exception or similar event that would alter processing flow in the DSS 10. In this case, the masking may involve temporarily intercepting/disabling the exception mechanism, so that normal processing continues and the fault condition is exposed to the NFT being executed.

In general, the two libraries of test routines NFTs, FIs, do not require separate physical implementation such as by use of respective distinct databases. In general these are simply separate logical collections of routines. In alternative embodiments, the GTM 12 may have links to various NFT and FI sources.

Figure 2:
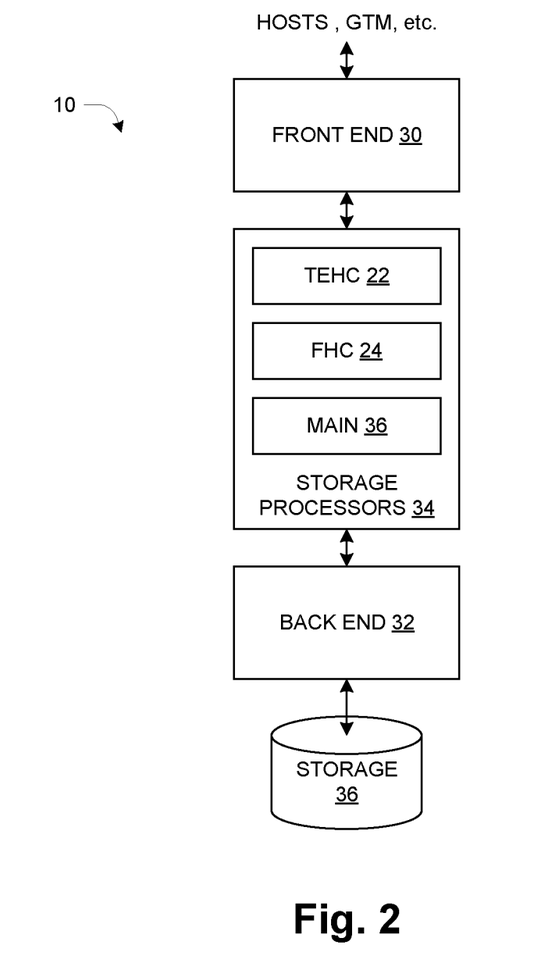
FIG. 2 is a block diagram of a data storage system device under test (DUT)

Also, in its most general form an NFT may actually include embedded fault processing, for example in the case of a fault that is specific to a particular aspect of operation and has no broader value from a testing perspective. Any such NFT can still be viewed as testing the normal functionality of the DSS 10 in the sense of its functionality independent from faults injected by an FI. Normal fault handling logic of the DSS 10 is simply another aspect of its normal functionality and may need to be tested in the presence of other fault conditions. As mentioned above, in many cases such normal fault handling logic may be intentionally disabled by masking, to appropriately test other functionality. In other cases it may be desired to activate such fault handling logic in order to test its response to additional fault conditions (e.g., a parity error handler might be exercised by injecting a disk full condition). FIG. 2 illustrates certain structure of the DSS 10. It includes front end logic 30, back end logic 32, a set of storage processors 34, and persistent secondary storage 36 such as magnetic media, Flash devices, etc. The front end logic 30 provides an interface to separate system elements such as host computers (HOSTS), the GTM 12, etc., where the hosts are essentially clients of the DSS 10 and its data storage services (e.g., issuing data read and write requests). The back end logic 32 provides the interface to the physical storage 36 where data is persistently stored. The storage processors 34 are a collection of processing complexes each including a CPU complex, memory, and I/O interface logic as generally known in the art (details omitted), along with interconnections such as one or more high-speed data buses among the individual storage processors for communications and data transfer therebetween, also as generally known. As illustrated, in pertinent part the storage processors 34 store and execute computer program instructions to realize the TEHC 22 and FHC 24, as well as the normal functional logic or components of the DSS 10 which are shown as MAIN 36.

Figure 3:
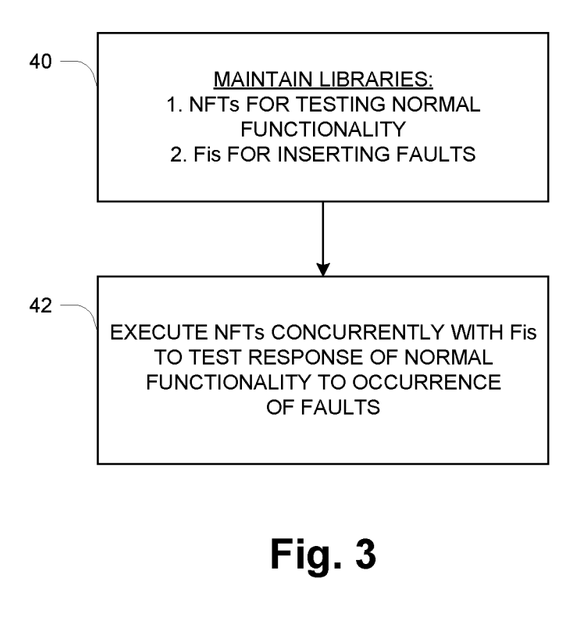
FIG. 3 is a flow diagram of test-related operation at a high level.

FIG. 3 is a flow diagram of operation of the test platform at a high level, which involves operations of all the components shown in FIG. 1.

At 40, two sets of libraries are maintained, which are (1) a library of NFTs for testing the normal functionality of the DSS 10, and (2) a library of fault inserters (FIs) for inserting corresponding fault conditions in the DSS 10. In one embodiment as illustrated in FIG. 1, these libraries can be stored in distinct NFT and Fault databases 14, 16 that are accessible to a test manager such as GTM 12.

At 42, a set of NFTs are executed concurrently with a selected set of FIs in order to test the response of the normal functionality of the DSS 10 to the corresponding fault conditions. As an example, an NFT may perform a series of read requests of corresponding stored data, while an FI may inject a disk fault that mimics the condition of a disk becoming inaccessible. By injecting this fault while performing this NFT, the response of the normal functional read logic to the occurrence of the disk fault is tested.

Figure 4:
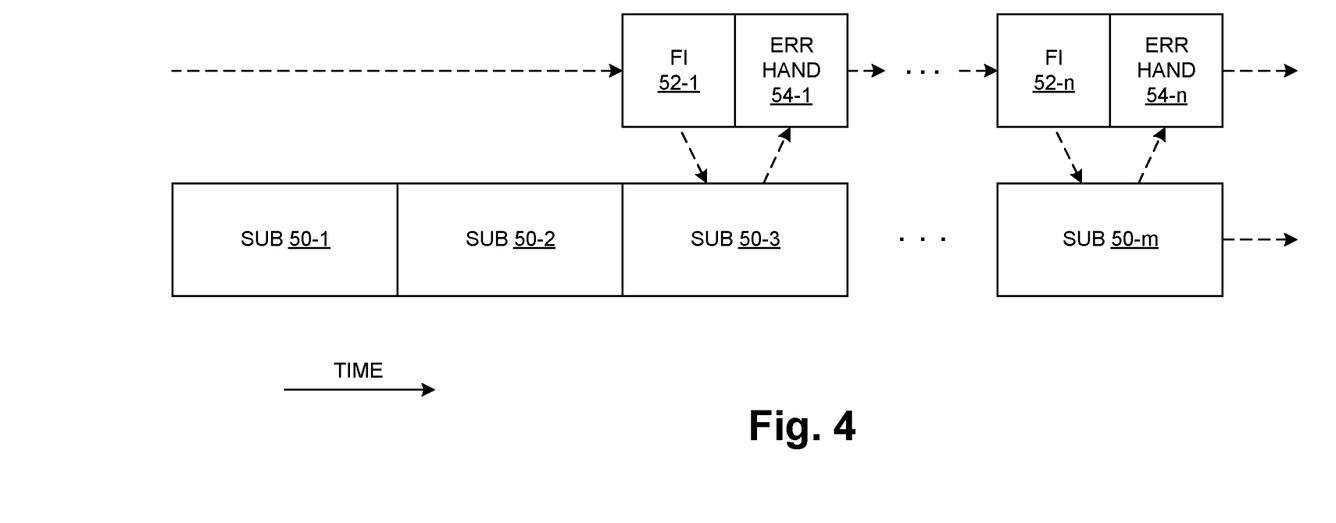
FIG. 4 is a schematic depiction of execution of a series of sub-test with concurrent and independent fault injection and error handling.

FIG. 4 is a schematic diagram illustrating the above operation. FIG. 4 shows two concurrent flows each proceeding time-wise from left to right. The lower flow is the normal-functional test flow, shown as a series execution of sub-tests 50 (50-1, 50-2, etc.) of an NFT, under the control of the TEHC 22 at the direction of the GTM 12. The upper flow is a series of fault injections 52 (52-1, 52-2, etc.) and corresponding error handlers 54 (54-1, 54-2, etc.), under the control of the FHC 24 at the direction of the GTM 12. In this example, the fault injection 52-1 creates a fault condition that is encountered by sub-test 50-3, which reacts to the fault condition in a manner that somehow indicates an error (e.g., by returning an error response to a read data request). The error handler 54-1, which is associated with the specific fault condition created by fault injector 52-1, receives the error-indicating response and processes it in a desired manner. For example, the error handler 54-1 might log the error-indicating response in a log of the test session, and it could also perform any cleanup that may be required to enable the testing to proceed to the next subtest (e.g., clearing error registers, resetting any error state, etc.). Analogous events and operations occurs for subsequent sub-tests and fault injections, as indicated for FI 52-n, error handler 54-n, and sub-test 50-m.

Although in this simple example only one fault is injected during each of the two subtests 50-3 and 50-m, in general there may be multiple fault injections or in some cases no fault injections, such as shown for subtests 50-1 and 50-2 for example. Another possibility is that a subtest 50 can be repeated multiple times with different injected faults (by corresponding different FIs 52), so as to test the response under different fault conditions. This illustrates a power of the technique, because such a testing approach requires only one version of the subtest and only as many FIs 52 as needed for the different fault conditions to be tested. The same FIs can be reused with other sub-tests. Thus, increased testing effectiveness can be achieved very efficiently.

The TEHC 22 and FHC 24 may communicate with each other to provide additional power and flexibility to the testing. For example, an NFT being handled by the TEHC 22 might provide signals indicating activation of specific processes that are part of the normal-function components 36 (FIG. 2), and selected FIs being handled by the FHC 24 may be designed to become active in response to such specific processes being executed, as signaled to them by an executing NFT. In another aspect, the FIs may be designed in a modular fashion to accept runtime input specifying specific devices or other targets of injected faults (e.g., specific disk drives, files, etc.). This may be accomplished using a configuration file, for example, created by the GTM 12 and consumed by the FHC 24.

While various embodiments of the invention have been particularly shown and described, it will be understood by those skilled in the art that various changes in form and details may be made therein without departing from the scope of the invention as defined by the appended claims.

What is claimed is:

1. A method of testing a data storage system, comprising:
   maintaining first and second libraries of test routines, the first library including a set of normal-functional tests each operable to test corresponding normal functionality of the data storage system, the second library including a set of fault inserters each being independently operable to induce a corresponding fault condition into the data storage system; and
   executing one or more of the normal-functional tests concurrently with one or more of the fault inserters to cause the normal-functional tests to encounter the corresponding fault conditions during execution and thereby test a response of the normal functionality of the data storage system to the occurrence of the fault conditions,
   wherein the libraries of test routines are maintained in corresponding databases accessible to a global test manager used to control the executing of the normal-functional tests concurrently with the fault inserters, and further including, by the global test manager, selecting the fault inserters and the normal-functional tests from the databases and providing them to the data storage system for execution,
   and wherein the fault inserters are designed in a modular fashion to accept runtime input specifying specific devices or other targets of injected faults.

2. The method according to claim 1, further including, in the data storage system:
   executing a test execution handler client and a fault handler client, the test execution handler client interacting with the global test manager to receive the normal-functional tests and performing local detail control operations to cause the normal-functional tests to be executed on the data storage system, the fault handler client interacting with the global test manager to receive the fault inserters and performing local detailed control operations to cause the fault inserters to be executed to create the corresponding fault conditions at selected times during the execution of the normal-functional tests.

3. The method according to claim 2, wherein the test execution handler client communicates with the fault handler client to signal occurrence of particular operations in the normal-functional tests, and the fault handler client operates in response to the signaling from the test execution handler client to execute particular fault inserters to inject the corresponding faults specifically during the particular operations.

4. The method according to claim 1, wherein the specific devices or other targets of injected faults include one or more of specific disk drives and specific files.

5. The method according to claim 1, wherein the fault inserters accept the runtime input from a configuration file created by the global test manager and accessed by the fault inserters when commencing execution.

6. The method according to claim 1, wherein executing the normal-functional tests concurrently with the fault inserters includes executing a given normal-functional test multiple times each concurrently with a corresponding distinct one of the fault inserters to cause the given normal-functional test to encounter the corresponding distinct fault conditions during execution.

7. The method according to claim 1, wherein the fault inserters have corresponding error handlers executed therewith, each error handler receiving a response of a concurrently executing normal-functional test to the fault condition created by the associated fault inserter and processing the response accordingly.

8. The method according to claim 7, wherein the processing by an error handler includes logging an error-indicating response of the normal-functional test in a log of a test session.

9. The method according to claim 7, wherein the processing by an error handler includes cleanup of error state as required to enable testing to proceed to a next normal-functional test.

10. The method according to claim 7, wherein the error handler include masking functionality to mask effects of injected faults from normal fault-handling mechanisms of the data storage system, to enable the normal-functional tests to encounter the corresponding fault conditions during execution.

11. A global test manager for testing a data storage system, the global test manager being a computerized system having processing circuitry, memory, and input/output interface circuitry for coupling the global test manager to the data storage system and to test library databases, the global test manager executing computer program instructions to cause the global test manager to:
   maintaining first and second libraries of test routines in the test library databases, the first library including a set of normal-functional tests each operable to test corresponding normal functionality of the data storage system, the second library including a set of fault inserters each being independently operable to induce a corresponding fault condition into the data storage system; and
   interact with the data storage system to cause the data storage system to execute one or more of the normal-functional tests concurrently with one or more of the fault inserters to cause the normal-functional tests to encounter the corresponding fault conditions during execution and thereby test a response of the normal functionality of the data storage system to the occurrence of the fault conditions,
   wherein the libraries of test routines are maintained in corresponding databases accessible to a global test manager used to control the executing of the normal-functional tests concurrently with the fault inserters, and further including, by the global test manager, selecting the fault inserters and the normal-functional tests from the databases and providing them to the data storage system for execution,
   and wherein the fault inserters are designed in a modular fashion to accept runtime input specifying specific devices or other targets of injected faults.

12. The global test manager according to claim 11, wherein the specific devices or other targets of injected faults include one or more of specific disk drives and specific files.

13. The global test manager according to claim 11, wherein the fault inserters accept the runtime input from a configuration file created by the global test manager and accessed by the fault inserters when commencing execution.

14. A data storage system comprising front end logic, back end logic, a set of storage processors, and persistent secondary storage, the front end logic providing an interface to client devices, the back end logic providing an interface to the persistent secondary storage, the storage processors each including a CPU complex, memory, and I/O interface logic and being coupled together for data transfer therebetween, the storage processors executing computer program instructions to realize a test execution handler client, a fault handler client, and normal functional components providing normal functionality of the data storage system, the test execution handler client and the fault handler client being co-operative to:
   receive a set of normal-functional tests and a set of fault inserters from a global test manager, the normal-functional tests each operable to test corresponding normal functionality of the data storage system, the fault inserters each being independently operable to induce a corresponding fault condition into the data storage system; and
   control execution of the normal-functional tests concurrently with one or more of the fault inserters to cause the normal-functional tests to encounter the corresponding fault conditions during execution and thereby test a response of the normal functionality of the data storage system to the occurrence of the fault conditions,
   wherein the libraries of test routines are maintained in corresponding databases accessible to a global test manager used to control the executing of the normal-functional tests concurrently with the fault inserters, and further including, by the global test manager, selecting the fault inserters and the normal-functional tests from the databases and providing them to the data storage system for execution,
   and wherein the fault inserters are designed in a modular fashion to accept runtime input specifying specific devices or other targets of injected faults.

15. The data storage system according to claim 14, wherein the test execution handler client interacts with the global test manager to receive the normal-functional tests and performing local detail control operations to cause the normal-functional tests to be executed on the data storage system, and the fault handler client interacts with the global test manager to receive the fault inserters and performing local detailed control operations to cause the fault inserters to be executed to create the corresponding fault conditions at selected times during the execution of the normal-functional tests.

16. The data storage system according to claim 15, wherein the test execution handler client communicates with the fault handler client to signal occurrence of particular operations in the normal-functional tests, and the fault handler client operates in response to the signaling from the test execution handler client to execute particular fault inserters to inject the corresponding faults specifically during the particular operations.

17. The data storage system according to claim 14, wherein the fault inserters have corresponding error handlers executed therewith, each error handler receiving a response of a concurrently executing normal-functional test to the fault condition created by the associated fault inserter and processing the response accordingly.

18. The data storage system according to claim 14, wherein the concurrent execution of the normal-functional tests and the fault injectors creates two concurrent processing flows in the data storage system, a first flow being a normal functional test flow having series execution of sub-tests under control of the test execution handler client, a second flow being a fault injection flow having a series of fault injections and corresponding error handlers under control of the fault handler client, each fault injection creating a corresponding fault condition encountered by a concurrent sub-test which reacts to the fault condition by generating an error-indicating response that is processed by the corresponding concurrent error handler.

19. The data storage system according to claim 14, wherein the specific devices or other targets of injected faults include one or more of specific disk drives and specific files.

20. The data storage system according to claim 14, wherein the fault inserters accept the runtime input from a configuration file created by the global test manager and accessed by the fault inserters when commencing execution.

21. The data storage system according to claim 14, wherein the test execution handler client and the fault handler client are further co-operative, when controlling execution of the normal-functional tests concurrently with the fault inserters, to cause a given normal-functional test to execute multiple times each concurrently with a corresponding distinct one of the fault inserters to cause the given normal-functional test to encounter the corresponding distinct fault conditions during execution.

\* \* \* \* \*